United States Patent
Botto et al.

(10) Patent No.: US 7,902,496 B2
(45) Date of Patent: Mar. 8, 2011

(54) METHOD OF DETERMINING PETRO-PHYSICAL INFORMATION WITH HIGH ENERGY GAMMA RAYS

(75) Inventors: Tancredi Botto, Cambridge, MA (US); Darwin Ellis, Ridgefield, CT (US)

(73) Assignee: Schlumberger Technology Corporation, Cambridge, MA (US)

( * ) Notice: Subject to any disclaimer, the term of this patent is extended or adjusted under 35 U.S.C. 154(b) by 156 days.

(21) Appl. No.: 12/144,377

(22) Filed: Jun. 23, 2008

(65) Prior Publication Data
US 2009/0039242 A1 Feb. 12, 2009

Related U.S. Application Data

(60) Provisional application No. 60/945,687, filed on Jun. 22, 2007.

(51) Int. Cl.
*G01V 5/10* (2006.01)

(52) U.S. Cl. .................................... 250/269.3

(58) Field of Classification Search ............... 250/269.1, 250/269.3, 269.7, 269.8
See application file for complete search history.

(56) References Cited

U.S. PATENT DOCUMENTS

| | | | | |
|---|---|---|---|---|
| 3,321,625 A | | 5/1967 | Wahl | |
| 3,842,264 A | * | 10/1974 | Arnold et al. | 250/264 |
| 3,864,569 A | * | 2/1975 | Tittman | 250/264 |
| 3,976,879 A | * | 8/1976 | Turcotte | 250/266 |
| 4,048,495 A | | 9/1977 | Ellis | |
| 4,093,854 A | * | 6/1978 | Turcotte et al. | 376/118 |
| 4,415,804 A | * | 11/1983 | Sowerby | 250/255 |
| 5,420,905 A | * | 5/1995 | Bertozzi | 378/88 |
| 5,804,820 A | * | 9/1998 | Evans et al. | 250/269.6 |
| 5,912,460 A | | 6/1999 | Stoller et al. | |
| 6,307,199 B1 | * | 10/2001 | Edwards et al. | 250/269.3 |
| 7,573,027 B2 | * | 8/2009 | Huiszoon | 250/269.1 |
| 7,647,182 B2 | * | 1/2010 | Hassan et al. | 702/6 |
| 2003/0106993 A1 | * | 6/2003 | Chen et al. | 250/269.1 |
| 2004/0256548 A1 | * | 12/2004 | Gardner | 250/266 |
| 2006/0015257 A1 | * | 1/2006 | Hassan et al. | 702/6 |
| 2007/0017673 A1 | * | 1/2007 | Hurst et al. | 166/255.1 |
| 2007/0040110 A1 | * | 2/2007 | Ellis et al. | 250/266 |
| 2007/0148059 A1 | * | 6/2007 | Golden | 422/186 |
| 2008/0083872 A1 | * | 4/2008 | Huiszoon | 250/269.3 |

OTHER PUBLICATIONS

Pak et al., Contribution to the Theory of Annihilation Gamm-ray Logging,Jun. 1992, Plenum Plublishing Corp., UDC 550.835,pp. 539-542.*

Gearhart, D., et al., The Use of a Compact Betatron as a Downhole Photon Source, IEEE Nuclear Science Symposium Conference Record, 1990, XP-002530138, pp. 825-829.

Pak, Y.N., et al. Contribution to the Theory of Annihilation [gamma]-ray Logging, translated from Russian, Atomic Energy, Consultants Bureau, New York, vol. 72, No. 6, Jun. 1992, pp. 539-542.

* cited by examiner

*Primary Examiner* — David P Porta
*Assistant Examiner* — Djura Malevic
(74) *Attorney, Agent, or Firm* — James McAleenan; Vincent Loccisano; Brigid Laffey

(57) ABSTRACT

Methods for density logging utilizes gamma-rays above a pair-production threshold so as to determine lithology information of formations whereby to correct a measured density data.

25 Claims, 1 Drawing Sheet

METHOD OF DETERMINING PETRO-PHYSICAL INFORMATION WITH HIGH ENERGY GAMMA RAYS

FIELD OF THE INVENTION

This invention relates to the field of borehole logging. Borehole logging is the science dedicated to the measurements of rock or reservoir properties in subsurface wells.

BACKGROUND OF THE INVENTION

By exposing the earth formation surrounding a well-bore to a gamma-ray (photon) source and observing the amount of radiation that returns or scatters, one can measure the average electronic density of the formation. This average or bulk density is in turn used to estimate the formation porosity, i.e., that volume of the rock formation that is potentially available to fluids or hydro-carbons. Accurate porosity estimates depend on the knowledge of the density of the underlying matrix rock (i.e. of the formation without the pore volume). As such one must identify also the rock type in the formation. This is done via a lithology or chemical composition measurement. The bulk density of rock matrix can be accurately parameterized in terms of its average atomic number.

Currently, most nuclear density tools rely on the measurement of scattered photons. Typically, photons travelling in the formation may scatter (Compton scattering) or be absorbed via the photo-electric effect. This approach is used both in "logging while drilling" and in wireline configurations for open-hole wells. In either case, the source of gamma-radiation employed is typically a high activity $^{137}$Cs cartridge that yields characteristic single-energy photons of 0.662 MeV.

The gamma-ray density measurement provides the best available measurement of formation porosity. Given their success, $^{137}$Cs sources are ubiquitously found in oil & gas fields around the world, and they have been used for decades in the E&P business. However, given the very high activity of the sources employed (1.5-2.0 Ci each), the continued use of $^{137}$Cs sources poses great safety and security risks, that service companies must manage with continued significant costs in terms of resources and energy.

SUMMARY OF THE INVENTION

According to an embodiment of the method of the invention, the method includes a technique to determine lithology information of rock formations using high energy gamma-ray scattering. The method exploits the process of pair production. In pair production reactions gamma-rays of energy above 1.02 MeV are absorbed by the electric field of atoms in a subsurface formation. The rate at which this conversion occurs approximately depends on the square of the formation average atomic number $Z_{ave}$ that in turn is related to the formation's lithology composition (e.g. sandstone, limestone and dolomite).

The lithology information (e.g. an estimate of $Z_{ave}$) can be obtained by comparing the rate of elastic Compton scattering to that of pair-production reactions. Whereas the former depend on the formation bulk density alone ($\square_b$), the latter is approximately proportional to the product ($\square_b * Z_{ave}$). This difference can be inferred by looking at the relative count rate of scattered gamma-rays of different energies, as measured in one or more photon detectors in a borehole tool. Events that fall in different regions of the scattered energy spectrum (such as in a "medium" and a "high" energy window) carry information that is largely dominated by Compton or pair-production reactions, respectively. Knowing the bulk density as determined from Compton scattering events, we can determine the matrix-rock type from the yield of pair-production events. This Lithology information can be utilized to independently correct the measured bulk density and thus more accurately determine the overall average formation porosity.

We define a lithology-sensitive pair-production factor PPF (PPF=$Z_{ave}$/10) in analogy to the photo-electric formation factor PEF (PEF=$(Z_{ave}/10)^{3.6}$). Similarly to the PEF, the PPF is a measure of the sensitivity to different lithological compositions, relative to bulk density effects.

Whereas the PEF or photo-electric absorption signal can in practice be determined only from gamma-rays of energies below approximately 0.2 MeV, the PPF or pair-production signal is carried by photons over an "open-ended" range of energies above the pair-production threshold at 1.02 MeV.

The lithology information obtained with the pair-production technique has the advantage of being insensitive to those effects due to the presence of barite-rich muds, well-casing, tool housing that significantly limit the quality and depth of investigation of photo-electric measurements. In addition, the PPF signal at the detector is relatively smooth and can be integrated over large energy windows with improved signal-to-noise characteristics relative to a PEF measurement at low energies.

PPF measurements preferably require a photon source with energy up to several MeV or more such as an accelerator based source. Accelerator based photon sources are intrinsically safe as they can be controlled and turned on or off by the user. The use of high-energy photon sources also offers the advantage of a greater depth of investigation, and thus of sampling the formation at greater distances from the borehole with less contribution from perturbations due to the borehole system itself.

One unambiguous signature of pair-production reactions is the measurement of positrons produced in the formation and scattering to the detectors. Such positrons can be uniquely identified via the characteristic 0.511 MeV peaks, e.g., annihilation signal, they produce in the detector response.

In summary, the pair-production technique offers significant advantages that increase the range of applicability of nuclear density tools and ultimately yield to more accurate and safer density measurements.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
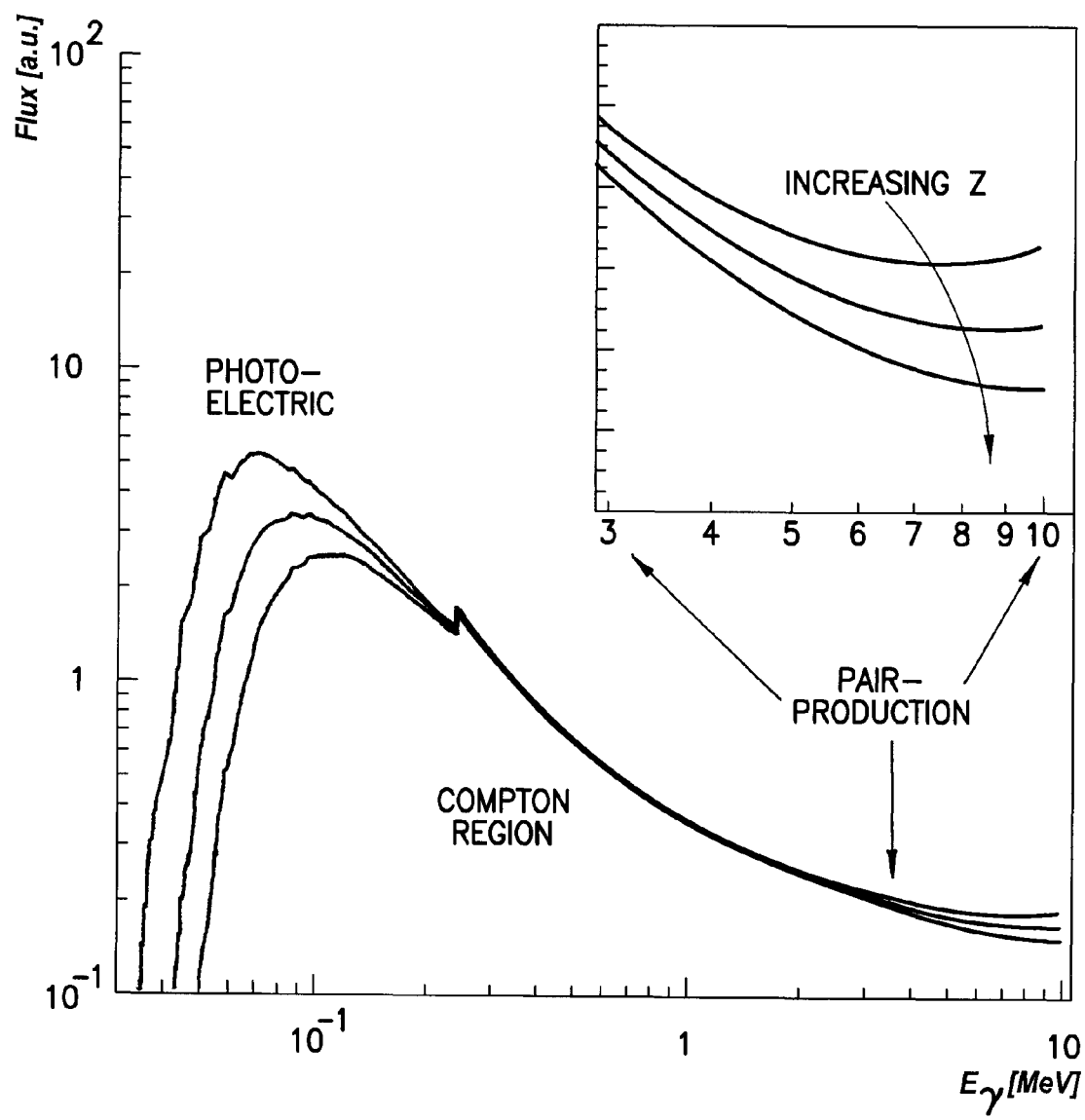
FIG. 1 illustrates an inset in the high-energy region of pair production showing the spectrum enhancement caused by different rock matrix types, wherein accurate measurements in this region (and/or at higher energies yet) allow one to identify the rock type for a given formation bulk density, according to at least one embodiment of the invention.

Given the different ways gamma-rays interact with matter, gamma-density measurements are sensitive to the energy of the incoming radiation, e. g., the energy emitted by the available nuclear source.

At low energies, gamma-ray interactions are dominated by the photoelectric reactions, where the incoming photon is absorbed by an atom resulting in a low-energy electron being knocked out. In this case gamma-rays are lost as well as information from the formation.

At the intermediate energy provided by $^{137}$Cs sources (0.662 MeV), gamma-rays interact by both photoelectric and Compton scattering processes. The Compton reaction dominates only for photon energies above 0.5 MeV. In Compton reactions photons do not disappear but scatter elastically off atomic electrons, including scattering in the backward direction (e.g. back towards the borehole). The rate at which Compton scattering occurs is directly proportional to the atomic electron density in the medium, which in turn can be shown to be proportional to the average mass density of the formation (in g/cc). With information about the rock matrix type, formation density can be accurately translated into porosity, i.e. that fraction of formation volume (pore space) that is available to fluids such as oil and gas.

The well-known gamma-ray density measurement widely employed in the E&P industry is indeed based on the Compton process. A variety of compensation schemes for borehole effects have also been disclosed. In these prior art implementations one typically utilizes an axis-symmetric tool string consisting of one nuclear source of gamma rays and two or more detectors at different distances along the length of the tool. These techniques are for instance described in U.S. Pat. No. 3,321,625 by Wahl, U.S. Pat. No. 4,048,495 by Ellis and U.S. Pat. No. 5,912,460 by Stoller et al.

These commonly used techniques present two different types of problems. First, incoming photons of 0.662 MeV penetrate at most only up to a few inches into the formation, thus the volume probed for density information is limited compared to the scale of the reservoir. In order to probe a greater fraction of the reservoir one would have to drill additional exploration holes, which entails additional operational costs, time and risks, or increase the intensity of the source, which entails additional safety and security costs and risks.

Secondly scattered photons are inevitably degraded on their way back to the borehole and the detector system. Indeed the probability of undergoing photoelectric reactions increases very rapidly for decreasing photon energies and therefore a significant fraction of the scattered photons may be absorbed by photoelectric reactions on their return path. This results in some of the density and lithology signal being lost and/or obscured and/or in the signal being dominated by effects taking place at short distance from the borehole wall or in the borehole itself such as those due to drilling muds and other borehole fluids, the presence of mudcakes and/or contaminated invasion zones, and tool and or borehole casings. Indeed, photo-electric absorption effects are strongly dependent on the material encountered right before entering the detectors, when the scattered photon energy is at its lowest. Environmental corrections to the gamma-density log data for these effects are quite common and at times become quite large.

These problems can be mitigated with higher energy photons. At higher energies photons are more penetrating and thus probe deeper into the formation. At high energies, gamma-rays can also interact in a new way, e.g., through the pair-production mechanism. In these reactions, photons annihilate into electron-positron pairs and thus are absorbed by the formation.

By measuring events at the detector in a medium and high energy window one can extract the formation porosity via measurements of the average (bulk) formation density and the properties of the formation matrix (lithology). Events that fall in the first region are dominated by Compton effects, and their count rate increases with increasing formation density. Events that fall in the high energy region are dominated by pair production, and their count rate decreases with increasing formation density. This is contrast with prior-art techniques where one utilizes a medium and a low energy window, dominated respectively by the Compton and the photoelectric effects.

According to an embodiment of a method of the invention, the method includes that the reliance on photoelectric effects can be eliminated, while the essential Compton mechanism is still in place. The situation is illustrated in FIG. 1 where we show a photon energy spectrum at equilibrium in a rock formation. The curves are for typical down-hole formations such as sandstone, dolomite and limestone (top to bottom), and are normalized to a given formation density. The inset in the high-energy region of pair production shows the spectrum enhancement caused by the different rock matrix types. Accurate measurements in this region (and/or at higher energies yet) allow one to identify the rock type independently from the overall formation density. This is conceptually similar to how it is done for the low-energy part of the spectrum (photoelectric region) but without the problems associated with low-energy photons that were described in the text. Note in FIG. 1, we assumed a source energy of several or possibly 10 MeV but similar results can be obtained for other source energies, including continuous bremsstrahlung-sources where the end-point energy is above the pair-production threshold.

With a gamma-ray source in the range of a few to several MeV and beyond one can significantly improve the accuracy of the gamma-density porosity determination by operating in a regime were the underlying physics of gamma-ray interactions is optimal. At the same time, the use of an accelerator or electronic source of photons also provides the added benefit of significantly lowering the risks and liabilities involved in field operations. Accelerators are intrinsically safe as their operation relies on sophisticated controls that can be easily disassembled or locked-out. High-energy gamma-ray logging is thus a safer, more secure and scientifically improved approach to formation evaluation with the potential of significantly advancing the industry's current oil-exploration capabilities.

What is claimed is:

1. A method for density logging, the method comprising:
wherein the method utilizes gamma-rays above a pair-production threshold so as to determine lithology information of formations whereby to correct a measured density data, by utilizing a lithology sensitive pair-production formation factor (PPF):

$$PPF = Z_{ave}/10 \text{ in}$$

where Z is an effective atomic number, and
wherein the PPF is a measure of the sensitivity to one or more lithological compositions, relative to bulk density effects.

2. The method of claim 1, wherein the lithology information is obtained by determining a rate of a plurality photons arriving at one or more detector with energies above the pair-production threshold.

3. The method of claim 1, wherein the pair-production threshold is approximately 1.02 MeV or greater.

4. The method of claim 1, wherein the gamma-rays are provided by at least one electronic source.

5. The method of claim 4, wherein the at least one electronic source is an electron accelerator that provides for an energy up to several MeV or more.

6. The method of claim 1, wherein the method is capable of determining one of an average or bulk density of the formation and a matrix density of the formation via identification of the lithology information of a reservoir.

7. The method of claim 1, wherein the gamma-rays above the pair-production threshold are produced by an accelerator source, such that the produced gamma-rays provide for further probing from a borehole into the formations resulting in obtaining density measurement data less sensitive to the group consisting of one of borehole wall non-uniformities, one or more washouts, one or more mudcakes or one or more fluid invasion zone at the interface to the formation, than gamma-rays produced below the pair-production threshold utilized for density logging.

8. The method of claim 5, wherein the electron accelerator source is controlled by one of an electrical control, a mechanical control or a magnetic control.

9. The method of claim 5, wherein the electron accelerator source is capable of being turned on or off by a user so as to provide for safety and security to well-logging operations.

10. The method of claim 1, wherein the method identifies pair-production interactions in the formation by detecting the gamma-ray signal resulting from one or more positron conversions through positron annihilation in presence of an atomic or free electron.

11. The method of claim 10, wherein the one or more positron conversions occur in the formation.

12. The method of claim 10, wherein the one or more positron conversions occurs at or near the detector volume.

13. The method of claim 10, wherein the one or more positron conversion generates a photon pair with an equal energy of about 0.511 MeV and results to peaks in a detector response at energies of one of about 0.511, about 1.02 MeV or both.

14. The method of claim 10, wherein the method determines pair-production information from the formation by combining an annihilation signal from the one or more positron conversions with a count rate signal above the pair production threshold.

15. The method of claim 1, wherein the gamma-rays above the pair-production threshold are produced by an accelerator source, such that the produced gamma-rays provide for a lithology measurement over an extended interval of an energy spectrum at a detector, and is less sensitive to the group consisting of one of a electronic drift, noise in a read out system, as well as resolution effects, non-linearities in the read-out system, the detector system or any combination thereof, than gamma-rays produced below the pair-production threshold utilized for density logging or measurements in a low energy region of the energy spectrum.

16. The method of claim 15, wherein a signal to noise ratio of the lithology measurement is improved by integrating over a larger interval of the energy spectrum at the detector than with photo-electric measurements.

17. The method of claim 1, wherein the gamma-rays are provided by one or more radio-nuclide gamma-ray sources.

18. A method for density logging, the method comprising:
wherein the method utilizes gamma-rays above a pair-production threshold produced by an accelerator source, such that the produced gamma-rays are more penetrating and probing gamma-rays from a borehole into the rock formations which allow for a greater depth of investigation, than gamma-rays produced below the pair-production threshold utilized for density logging, so as to determine lithology information of formations whereby to correct a measured density data, by utilizing a lithology sensitive pair-production formation factor (PPF):

$PPF = Z_{ave}/10$ in where Z is an effective atomic number, and
wherein the PPF is a measure of the sensitivity to one or more lithological compositions, relative to bulk density effects.

19. The method of claim 18, wherein the depth of investigation includes gathering lithology information of the rock formations at distances from the borehole with less contribution from perturbation from a borehole system itself.

20. The method of claim 18, wherein the produced gamma-rays above the pair-production threshold are substantially less sensitive to environment effects due to the group consisting of tool casing, one or more detector windows and one or more detector packaging, than gamma-rays produced below the pair-production threshold utilized for density logging which are more sensitive to the environment effects.

21. The method of claim 18, wherein the accelerator source is controlled by one of an electrical control, a mechanical control or a magnetic control.

22. The method of claim 21, wherein the accelerator source is a downhole accelerator source capable of being turned on or off by a user so as to provide for safety and security to well-logging operations.

23. The method of claim 18, wherein the gamma-rays are provided by one or more radio-nuclide gamma-ray sources.

24. A method for lithology for density logging, the method comprising:
wherein the method utilizes high energy gamma-rays such as those above a pair-production threshold provide for density measurements from behind one of a borehole casing and/or a tool casing, so as to determine lithology information of formations whereby to correct a measured density data, by utilizing a lithology sensitive pair-production formation factor (PPF):

$PPF = Z_{ave}/10$ in where Z is an effective atomic number, and
wherein the PPF is a measure of the sensitivity to one or more lithological compositions, relative to bulk density effects.

25. The method of claim 24, wherein the density measurements are corrected for environment effects by one of photo-electric, pair production data or any combination thereof.

* * * * *